(12) United States Patent
Wong

(10) Patent No.: US 11,025,989 B2
(45) Date of Patent: Jun. 1, 2021

(54) LIVE EVENT VIDEO STREAM SERVICE

(71) Applicant: Live Inc., Scottsdale, AZ (US)

(72) Inventor: Keith Wong, Scottsdale, AZ (US)

(73) Assignee: Live Inc., Scottsdale, AZ (US)

( * ) Notice: Subject to any disclaimer, the term of this patent is extended or adjusted under 35 U.S.C. 154(b) by 7 days.

(21) Appl. No.: 16/275,182

(22) Filed: Feb. 13, 2019

(65) Prior Publication Data

US 2020/0260150 A1 Aug. 13, 2020

(51) Int. Cl.
*H04N 21/2543* (2011.01)
*H04N 21/2187* (2011.01)
*H04N 21/218* (2011.01)
*H04N 21/81* (2011.01)
*H04N 21/472* (2011.01)
*H04N 21/4788* (2011.01)
*G06Q 30/08* (2012.01)
*G06Q 20/12* (2012.01)

(52) U.S. Cl.
CPC ..... *H04N 21/47211* (2013.01); *G06Q 20/123* (2013.01); *G06Q 30/08* (2013.01); *H04N 21/2187* (2013.01); *H04N 21/21805* (2013.01); *H04N 21/4788* (2013.01)

(58) Field of Classification Search
CPC ........... H04N 21/21805; H04N 21/218; H04N 21/2187; G06Q 20/123
See application file for complete search history.

(56) References Cited

U.S. PATENT DOCUMENTS

| | | | |
|---|---|---|---|
| 2006/0031899 A1* | 2/2006 | Rabin | G06Q 20/123 725/104 |
| 2007/0018952 A1* | 1/2007 | Arseneau | H04H 40/27 345/156 |
| 2007/0143185 A1* | 6/2007 | Harmon | G06Q 30/0207 705/14.16 |
| 2012/0092510 A1* | 4/2012 | Masters | H04N 21/21805 348/207.1 |
| 2015/0215603 A1* | 7/2015 | Hines | H04L 65/4076 348/14.12 |
| 2017/0264936 A1* | 9/2017 | Depies | G06T 19/006 |
| 2019/0174109 A1* | 6/2019 | Yoshikawa | H04N 13/279 |

* cited by examiner

*Primary Examiner* — Hsiungfei Peng
(74) *Attorney, Agent, or Firm* — Ellenoff Grossman & Schole LLP; James M. Smedley; Alex Korona

(57) ABSTRACT

Apparatus and associated methods relate to a live event video stream service configured to distribute event video streams at diverse price levels, based on configuring video cameras to capture live event video streams from different locations, offering the video streams for purchase at prices based on the camera locations, and automatically maximizing profit by adjusting the quantity and price of the offered camera video streams. In an illustrative example, the cameras may be 360-degree video cameras. The camera locations may be, for example, preferred event viewing positions. In some examples, the cameras may be configured in live event viewing positions ranging from more preferred to less preferred, permitting a range of video stream prices determined based on each camera's position. Some embodiments may determine video stream price based on an auction. Various examples may advantageously maximize event profit based on adjusting the quantity and price of the offered video streams.

18 Claims, 10 Drawing Sheets

LIVE EVENT VIDEO STREAM SERVICE

TECHNICAL FIELD

Various embodiments relate generally to live event video stream distribution.

BACKGROUND

Live events include concerts, sports, lectures, exhibitions, meetings, and official proceedings. In some scenarios, a live event operator may sell event tickets to users wishing to access and attend the live event on-site, and in-person. Various live event examples include on-site event tickets sold at diverse prices for on-site attendance. For example, a live event operator producing a concert may sell seat tickets to in-person concert-goers at a variety of price levels. Some ticket prices for in-person event attendance may be very high, based on the desirability of the seat associated with the ticket. Some event operators offer event video streams to remote viewers.

Video is a visual image sequence. Some cameras capture a sequence of images, and provide a video stream. Some video camera users may configure a video camera to capture an image sequence from a live event. For example, a live event operator may position a video camera to capture a live event video stream. In an illustrative example, the video camera may be configured to distribute a live event video stream via the Internet to viewers far away from the live event. In some examples, the live event operator may offer the live event video stream for purchase by viewers around the world. Some video cameras may be configured to capture images from a broad visual field of a live event. For example, a 360-degree video camera may capture and stream a panoramic view of a live event.

In some scenarios, the range of live event ticket prices for in-person attendance may be a function of the event venue seating supply and demand. For example, a large concert hall may offer many seats some distance from the event performance stage, at a low price level. On the other hand, the same concert hall may offer fewer seats much closer to the stage, at a much higher price level. In an illustrative example, the contrasting supply and demand inherent in the quantities of seats that can be offered at different price levels may be a result of the scarcity of the higher priced seats. In such an example, the event operator may be able to maximize event profit by adjusting in-person ticket price levels as a function of the available seat quantities, selling some seats at different price levels based on proximity to the event stage. A live event operator offering video streams of the live event may be unable to maximize live event video stream profit, because there may be only a single price level for a video stream captured from a single camera position.

SUMMARY

Apparatus and associated methods relate to a live event video stream service configured to distribute event video streams at diverse price levels, based on configuring video cameras to capture live event video streams from different locations, offering the video streams for purchase at prices based on the camera locations, and automatically maximizing profit by adjusting the quantity and price of the offered camera video streams. In an illustrative example, the cameras may be 360-degree video cameras. The camera locations may be, for example, preferred event viewing positions. In some examples, the cameras may be configured in live event viewing positions ranging from more preferred to less preferred, permitting a range of video stream prices determined based on each camera's position. Some embodiments may determine video stream price based on an auction. Various examples may advantageously maximize event profit based on adjusting the quantity and price of the offered video streams.

Various embodiments may achieve one or more advantages. For example, some embodiments may reduce an event operator's effort maximizing event video stream profit. This facilitation may be a result of adjusting the price and quantity of video streams captured from different camera locations, based on the video stream desirability. Some embodiments may increase the availability of live event video streams offered at diverse prices. Such increased availability of live event video streams offered at diverse prices may be a result of creating multiple unique video streams having a range of desirability. In an illustrative example, event video stream price and quantity may be determined as a function of the camera's proximity to the event stage. Some examples may increase the availability of lower-priced video streams offered to less affluent consumers, while permitting the event operator to maintain a desired profit margin. This facilitation may be a result of automatically maximizing live event video stream profit based on adjusting the quantity and price of the unique video streams offered. For example, a live event operator may adjust to a targeted profit level based on increasing the quantity of lower-priced video streams, and increasing the price of higher priced video streams.

Various examples may enable a live event operator to offer video streams at diverse prices. Such video stream price diversity may be a result of scarcity created based on adjusting the quantity of event video streams captured by cameras positioned at multiple unique event locations. Some implementations may automatically configure the video stream scarcity and price levels based on what an audience is able to pay. Such automatic video stream price and availability adjustment may be a result of an auction conducted to determine the number of video streams captured from different event vistas. In an illustrative example, various automatic video stream price and availability adjustments may enable a live event operator to maximize profit while providing affordable event streams to a wider potential audience, ranging from more affluent to less affluent. Some embodiments may increase an event stream viewer's live event viewing choice. Such increased live event viewing choices may be a result of an event operator offering diverse video streams captured from cameras at unique locations, providing the viewer a choice of one or more different event vistas. In an illustrative example, a viewer may select one, more than one, a subset, or all of the video stream channels offered, based on the viewer's choice.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, automatically maximizing profit by adjusting the quantity and price of the offered camera video streams is briefly introduced with reference to FIGS. 1-2. Then, with reference to FIGS. 3-5, the discussion turns to exemplary embodiments that illustrate structural implementations of computer-implemented electronic apparatus designed to maximize live event profit distributing event audio and video streams at diverse price levels with a multimedia stream price and quantity adapting action. Specifically, exemplary video stream server, video stream camera, and video stream viewer implementations are disclosed. Finally, with reference to FIGS. 6-9, illustrative user interface and process flow designs exemplary of embodiment live event video stream distribution implementations are described.

Figure 1:
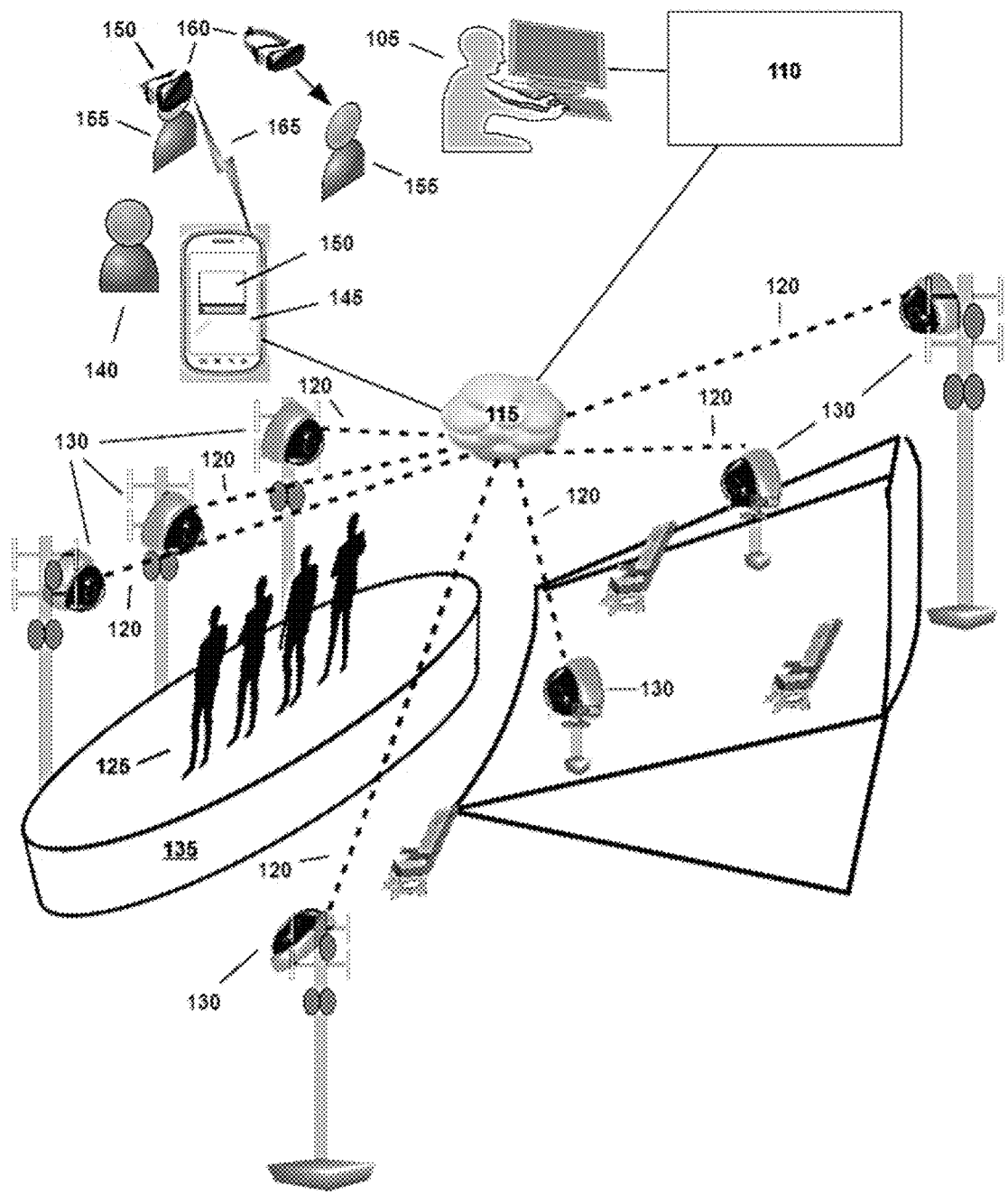
FIG. 1 depicts an illustrative operational scenario wherein a live event operator maximizes event profit using an exemplary live event video stream service configured to distribute event video streams at diverse price levels, based on configuring video cameras to capture live event video streams from different locations, offering the video streams for purchase at prices based on the camera locations, and automatically maximizing profit by adjusting the quantity and price of the offered camera video streams.

FIG. 1 depicts an illustrative operational scenario wherein a live event operator maximizes event profit using an exemplary live event video stream service configured to distribute event video streams at diverse price levels, based on configuring video cameras to capture live event video streams from different locations, offering the video streams for purchase at prices based on the camera locations, and automatically maximizing profit by adjusting the quantity and price of the offered camera video streams. In FIG. 1, the event operator 105 employs the live event video stream service 110 communicatively coupled with the network cloud 115 to distribute video streams 120 of the live event 125 captured by each camera 130 at diverse price levels based on the unique location of each camera 130, while automatically maximizing profit by adjusting the quantity and price of the offered camera 130 video streams 120. In the depicted example, each camera 130 is communicatively coupled via wireless links with the network cloud 115 and configured to capture a unique video stream 120 determined as a function of the camera 130 position relative to the live event 125 stage 135. In the illustrated example, the live event video stream service 110 offers the live event 125 video streams 120 to the viewer 140 using the viewer 140 mobile device 145 communicatively coupled with the network cloud 115. In the depicted embodiment, the viewer 140 mobile device 145 is configured with the user interface 150 adapted to facilitate selection, adjustment, and viewing of diverse live event video streams captured from multiple unique camera positions. In the illustrated example, each camera 130 is a 360-degree video camera configured with an imaging sensor adapted to capture video, and a microphone adapted to capture audio. Various implementations may permit the viewer 140 to customize in the user interface 150 an audio mix including audio from more than one camera 130. In some embodiments, some camera 130 configurations may be mounted to an airborne drone. In various designs, the viewer 140 may be presented with options to select multiple video streams for viewing on the mobile device 145. In the depicted example, the viewer 140 is provided with the audio feed captured by each camera 130 selected for viewing. In the illustrated example, the user 140 may customize the viewing position of each selected camera 130 via controls configured in the user interface 150. In the depicted embodiment, the user 155 also desires to enjoy a video stream of the live event 125. In the illustrated example, the user 155 does not have his mobile device nearby, however the user 155 does have access to the virtual reality headset 160. In the depicted embodiment, the user 155 connects the virtual reality headset 160 to the mobile device 145 via the wireless link 165. In the illustrated embodiment, after placing the virtual reality headset 160 in a viewing position on his head, the user 155 is able to enjoy his own private instantiation of the user interface 150 configured in the mobile device 145. For example, the user 155 is able to access the user interface 150 to log in to his own account, select his own event to view, and choose his own live streams to view in the virtual reality headset 160, independent of the experience of the viewer 140. In various embodiments, the user interface 150 may present a shared live stream experience to the viewer 140 and the viewer 155. For example, in such a shared live stream experience, the viewer 140 and the viewer 155 may access copies of user interface 150 display elements and streams in their respective user interface 150 instantiation. In some designs, the user interface 150 may present different interfaces and live stream experiences to the viewer 140 and the viewer 155, based on each viewer using a separate user interface 150 instantiated in the mobile device 145 to select or order any of the available channels or events. In some embodiments, the user 155 may connect his own mobile device, a device separate and distinct from the mobile device 145, to the live event video stream service 110, and connect his virtual reality headset to his own mobile device to enjoy the live stream content via a user interface 150 instance activated in his mobile device. In an illustrative example, in addition to a mobile device or a computer screen, a virtual reality headset may provide additional opportunities to maximize revenue across device classes. In the illustrated embodiment, the event operator 105 maximizes revenue from the live event based on adjusting the video stream 120 price and quantity. For example, each viewer may purchase a basic video stream ticket for the stream from the main or primary camera capturing the event. Then, each potential viewer may purchase additional video streams that are more preferred than the main or primary camera stream, based on the proximity of the additional camera to the event stage. In some examples, the event operator 105 may raise the price of streams from cameras close to the stage, and increase the quantity of streams further from the stage. In an illustrative example, the event operator 105 may be able to maximize profit from the video streams based on creating scarcity of the streams captured closer to the stage. In some examples, the event operator 105 may maximize revenue to reach a target revenue value, based on adjusting stream price and quantity available from each camera location. In other examples, the event operator 105 may conduct an online auction to set the price and quantity of streams available from each camera location, permitting revenue to be maximized while maintaining a degree of fairness to the potential audience. Various advantages and improvements are herein below disclosed with exemplary references to illustrative embodiments.

Figure 2:
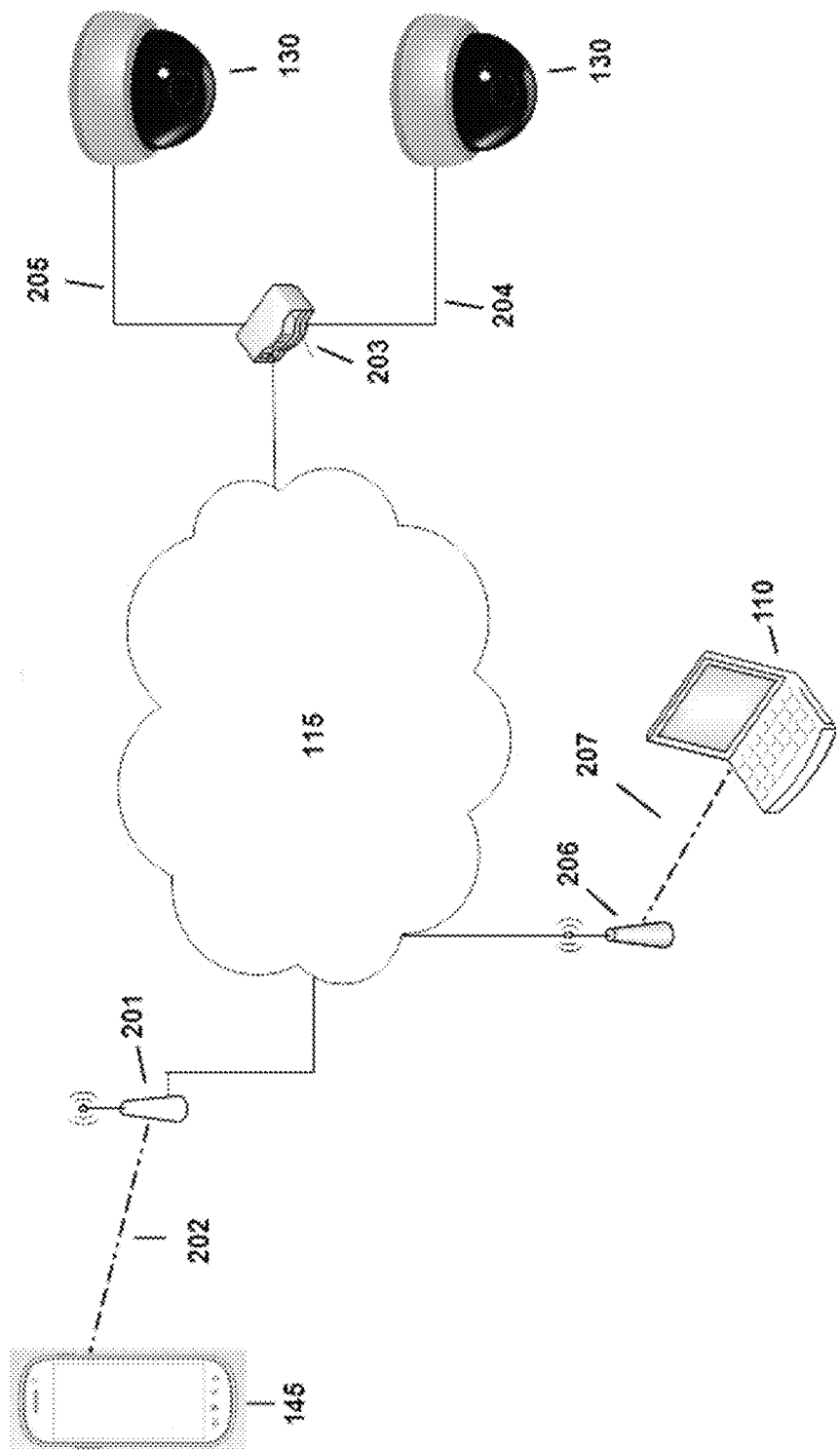
FIG. 2 depicts a schematic view of an exemplary live event video stream service network configured to distribute event video streams at diverse price levels, based on configuring video cameras to capture live event video streams from different locations, offering the video streams for purchase at prices based on the camera locations, and automatically maximizing profit by adjusting the quantity and price of the offered camera video streams.

FIG. 2 depicts a schematic view of an exemplary live event video stream service network configured to distribute event video streams at diverse price levels, based on configuring video cameras to capture live event video streams from different locations, offering the video streams for purchase at prices based on the camera locations, and automatically maximizing profit by adjusting the quantity and price of the offered camera video streams. In FIG. 2, according to an exemplary embodiment of the present disclosure, data may be transferred to the system, stored by the system and/or transferred by the system to users of the system across local area networks (LANs) or wide area networks (WANs). In accordance with various embodiments, the system may include numerous servers, data mining hardware, computing devices, or any combination thereof, communicatively connected across one or more LANs and/or WANs. One of ordinary skill in the art would appreciate that there are numerous manners in which the system could be configured, and embodiments of the present disclosure are contemplated for use with any configuration. Referring to FIG. 2, a schematic overview of a system in accordance with an embodiment of the present disclosure is shown. In the depicted embodiment, an exemplary system includes the exemplary live event video stream service 110 configured to distribute event video streams at diverse price levels. In the illustrated embodiment, the live event video stream service 110 is a computing device adapted to configure video cameras to capture live event video streams from different locations, offer the video streams for purchase at prices based on the camera locations, and automatically maximize profit by adjusting the quantity and price of the offered camera video streams. In the depicted embodiment, each camera 130 is a multimedia capture device adapted to stream video captured from diverse event locations. In the depicted example, the mobile device 145 is a smartphone adapted to present event video streamed from diverse event locations. In the illustrated embodiment, the mobile device 145 is communicatively and operably coupled by the wireless access point 201 and the wireless link 202 with the network cloud 115 (e.g., the Internet) to send, retrieve, or manipulate information in storage devices, servers, and network components, and exchange information with various other systems and devices via the network cloud 115. In the depicted example, the illustrative system includes the router 203 configured to communicatively and operably couple the first camera 130 to the network cloud 115 via the communication link 204. In the illustrated example, the router 203 also communicatively and operably couples the second camera 130 to the network cloud 115 via the communication link 205. In the depicted embodiment, the live event video stream service 110 is communicatively and operably coupled with the network cloud 115 by the wireless access point 206 and the wireless communication link 207. In various examples, one or more of: the mobile device 145, cameras 130, or live event video stream service 110 may include an application server configured to store or provide access to information used by the system. In various embodiments, one or more application server may retrieve or manipulate information in storage devices and exchange information through the network cloud 115. In some examples, one or more of: the mobile device 145, cameras 130, or live event video stream service 110 may include various applications implemented as processor-executable program instructions. In some embodiments, various processor-executable program instruction applications may also be used to manipulate information stored remotely and process and analyze data stored remotely across the network cloud 115 (e.g., the Internet). According to an exemplary embodiment, as shown in FIG. 2, exchange of information through the network cloud 115 or other network may occur through one or more high speed connections. In some cases, high speed connections may be over-the-air (OTA), passed through networked systems, directly connected to one or more network cloud 115 or directed through one or more router. In various implementations, one or more router may be optional, and other embodiments in accordance with the present disclosure may or may not utilize one or more router. One of ordinary skill in the art would appreciate that there are numerous ways any or all of the depicted devices may connect with the network cloud 115 for the exchange of information, and embodiments of the present disclosure are contemplated for use with any method for connecting to networks for the purpose of exchanging information. Further, while this application may refer to high speed connections, embodiments of the present disclosure may be utilized with connections of any useful speed. In an illustrative example, components or modules of the system may connect to one or more of: the mobile device 145, cameras 130, or live event video stream service 110 via the network cloud 115 or other network in numerous ways. For instance, a component or module may connect to the system i) through a computing device directly connected to the network cloud 115, ii) through a computing device connected to the network cloud 115 through a routing device, or iii) through a computing device connected to a wireless access point. One of ordinary skill in the art will appreciate that there are numerous ways that a component or module may connect to a device via network cloud 115 or other network, and embodiments of the present disclosure are contemplated for use with any network connection method. In various examples, one or more of: the mobile device 145, cameras 130, or live event video stream service 110 could include a personal computing device, such as a smartphone, tablet computer, wearable computing device, cloud-based computing device, virtual computing device, or desktop computing device, configured to operate as a host for other computing devices to connect to. In some examples, one or more communications means of the system may be any circuitry or other means for communicating data over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Figure 3:
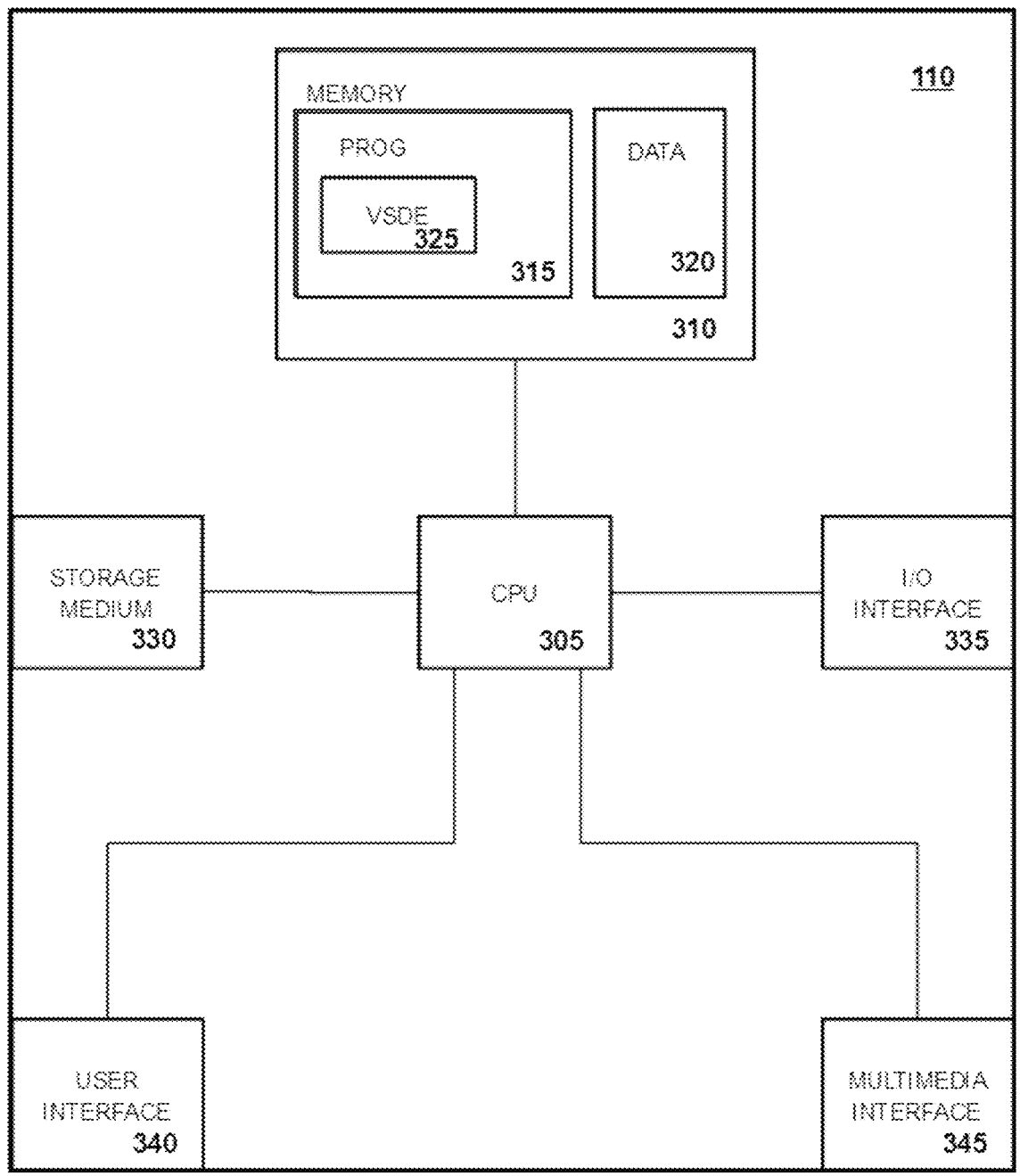
FIG. 3 depicts a structural view of an exemplary computing device configured to offer video streams for purchase at prices based on camera locations, and automatically maximize profit by adjusting the quantity and price of the offered camera video streams.

FIG. 3 depicts a structural view of an exemplary computing device configured to offer video streams for purchase at prices based on camera locations, and automatically maximize profit by adjusting the quantity and price of the offered camera video streams. In FIG. 3, the block diagram of the exemplary live event video stream service 110 includes processor 305 and memory 310. The processor 305 is in electrical communication with the memory 310. The depicted memory 310 includes program memory 315 and data memory 320. The depicted program memory 315 includes processor-executable program instructions implementing the Video Stream Distribution Engine (VSDE) 325. In some embodiments, the illustrated program memory 315 may include processor-executable program instructions configured to implement an OS (Operating System). In various embodiments, the OS may include processor executable program instructions configured to implement various operations when executed by the processor 305. In some embodiments, the OS may be omitted. In some embodiments, the illustrated program memory 315 may include processor-executable program instructions configured to implement various Application Software. In various embodiments, the Application Software may include processor executable program instructions configured to implement various operations when executed by the processor 305. In some embodiments, the Application Software may be omitted. In the depicted embodiment, the processor 305 is communicatively and operably coupled with the storage medium 330. In the depicted embodiment, the processor 305 is communicatively and operably coupled with the I/O (Input/Output) module 335. In the depicted embodiment, the I/O module 335 includes a network interface. In various implementations, the network interface may be a wireless network interface. In some designs, the network interface may be a Wi-Fi interface. In some embodiments, the network interface may be a Bluetooth interface. In an illustrative example, the live event video stream service 110 may include more than one network interface. In some designs, the network interface may be a wireline interface. In some designs, the network interface may be omitted. In the depicted embodiment, the processor 305 is communicatively and operably coupled with the user interface 340. In various implementations, the user interface 340 may be adapted to receive input from a user or send output to a user. In some embodiments, the user interface 340 may be adapted to an input-only or output-only user interface mode. In various implementations, the user interface 340 may include an imaging display. In some embodiments, the user interface 340 may include an audio interface. In some designs, the audio interface may include an audio input. In various designs, the audio interface may include an audio output. In some implementations, the user interface 340 may be touch-sensitive. In some designs, the live event video stream service 110 may include an accelerometer operably coupled with the processor 305. In various embodiments, the live event video stream service 110 may include a GPS module operably coupled with the processor 305. In an illustrative example, the live event video stream service 110 may include a magnetometer operably coupled with the processor 305. In some embodiments, the user interface 340 may include an input sensor array. In various implementations, the input sensor array may include one or more imaging sensor. In various designs, the input sensor array may include one or more audio transducer. In some implementations, the input sensor array may include a radio-frequency detector. In an illustrative example, the input sensor array may include an ultrasonic audio transducer. In some embodiments, the input sensor array may include image sensing subsystems or modules configurable by the processor 305 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In various implementations, the depicted memory 310 may contain processor executable program instruction modules configurable by the processor 305 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In some embodiments, the input sensor array may include audio sensing subsystems or modules configurable by the processor 305 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In various implementations, the depicted memory 310 may contain processor executable program instruction modules configurable by the processor 305 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In the depicted embodiment, the processor 305 is communicatively and operably coupled with the multimedia interface 345. In the illustrated embodiment, the multimedia interface 345 includes interfaces adapted to input and output of audio, video, and image data. In some embodiments, the multimedia interface 345 may include one or more still image camera or video camera. In various designs, the multimedia interface 345 may include one or more microphone. In some implementations, the multimedia interface 345 may include a wireless communication means configured to operably and communicatively couple the multimedia interface 345 with a multimedia data source or sink external to the live event video stream service 110. In various designs, the multimedia interface 345 may include interfaces adapted to send, receive, or process encoded audio or video. In various embodiments, the multimedia interface 345 may include one or more video, image, or audio encoder. In various designs, the multimedia interface 345 may include one or more video, image, or audio decoder. In various implementations, the multimedia interface 345 may include interfaces adapted to send, receive, or process one or more multimedia stream. In various implementations, the multimedia interface 345 may include a GPU. Some implementations may include an audio mixing capability operable via a remote network connection. In some embodiments, the multimedia interface 345 may be omitted. Useful examples of the illustrated live event video stream service 110 include, but are not limited to, personal computers, servers, tablet PCs, smartphones, or other computing devices. In some embodiments, multiple live event video stream service 110 devices may be operably linked to form a computer network in a manner as to distribute and share one or more resources, such as clustered computing devices and server banks/farms. Various examples of such general-purpose multi-unit computer networks suitable for embodiments of the disclosure, their typical configuration and many standardized communication links are well known to one skilled in the art, as explained in more detail in the foregoing FIG. 2 description. In some embodiments, an exemplary live event video stream service 110 design may be realized in a distributed implementation. In an illustrative example, some live event video stream service 110 designs may be partitioned between a client device, such as, for example, a phone, and, a more powerful server system, as depicted, for example, in FIG. 2, in various designs, a live event video stream service 110 partition hosted on a PC or mobile device may choose to delegate some parts of computation, such as, for example, machine learning or deep learning, to a host server. In some embodiments, a client device partition may delegate computation-intensive tasks to a host server to take advantage of a more powerful processor, or to offload excess work. In an illustrative example, some devices may be configured with a mobile chip including an engine adapted to implement specialized processing, such as, for example, neural networks, machine learning, artificial intelligence, image recognition, audio processing, or digital signal processing. In some embodiments, such an engine adapted to specialized processing may have sufficient processing power to implement some features. However, in some embodiments, an exemplary live event video stream service 110 may be configured to operate on a device with less processing power, such as, for example, various gaming consoles, which may not have sufficient processor power, or a suitable CPU architecture, to adequately support the live event video stream service 110. Various embodiment designs configured to operate on a such a device with reduced processor power may work in conjunction with a more powerful server system.

Figure 4:
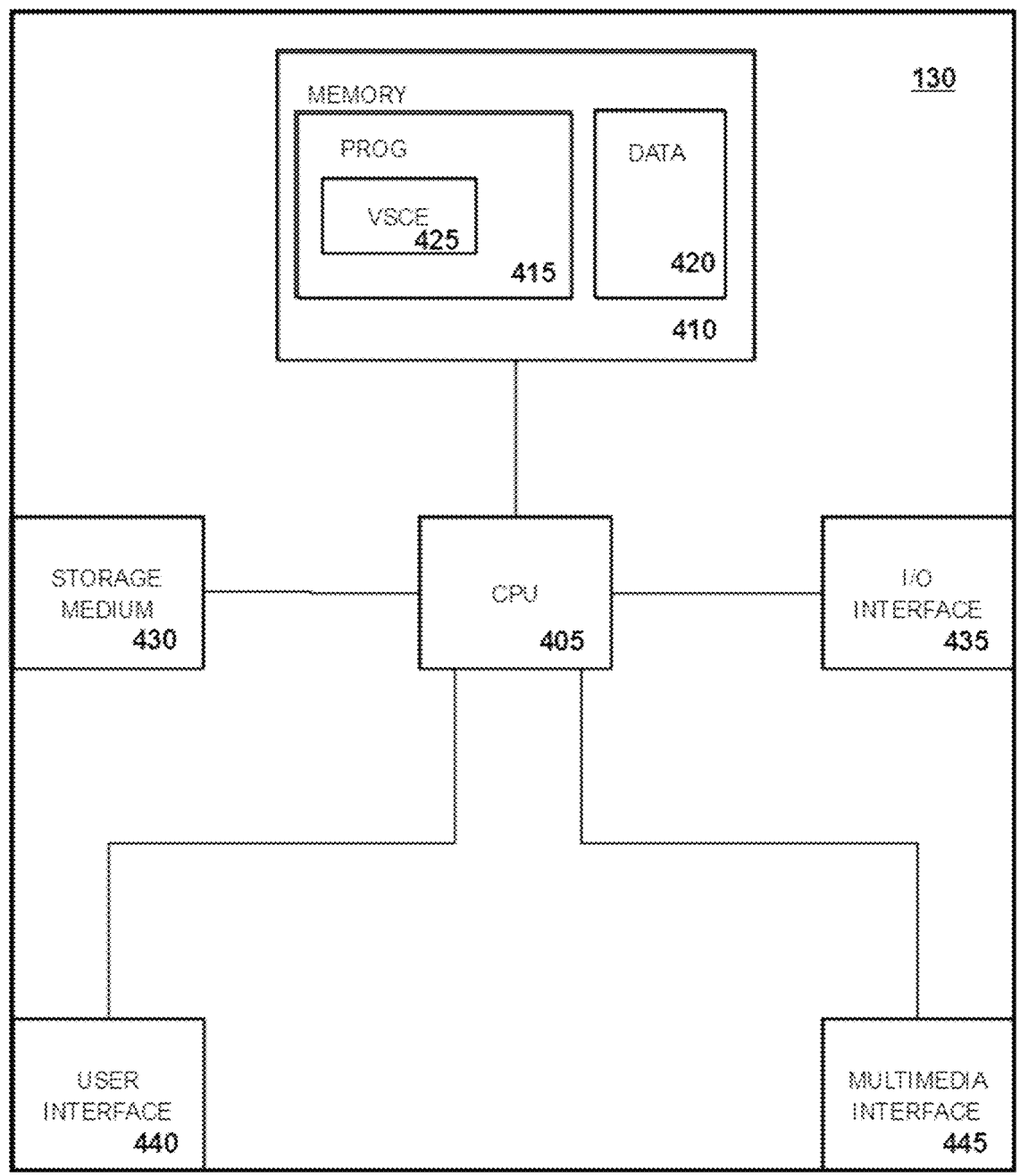
FIG. 4 depicts a structural view of an exemplary camera adapted to stream video captured from diverse event locations.

FIG. 4 depicts a structural view of an exemplary camera adapted to stream video captured from diverse event locations. In FIG. 4, the block diagram of the exemplary camera 130 includes processor 405 and memory 410. The processor 405 is in electrical communication with the memory 410. The depicted memory 410 includes program memory 415 and data memory 420. The depicted program memory 415 includes processor-executable program instructions implementing the Video Stream Capture Engine (VSCE) 425. In some embodiments, the illustrated program memory 415 may include processor-executable program instructions configured to implement an OS (Operating System). In various embodiments, the OS may include processor executable program instructions configured to implement various operations when executed by the processor 405. In some embodiments, the OS may be omitted. In some embodiments, the illustrated program memory 415 may include processor-executable program instructions configured to implement various Application Software. In various embodiments, the Application Software may include processor executable program instructions configured to implement various operations when executed by the processor 405. In some embodiments, the Application Software may be omitted. In the depicted embodiment, the processor 405 is communicatively and operably coupled with the storage medium 430. In the depicted embodiment, the processor 405 is communicatively and operably coupled with the I/O (Input/Output) module 435. In the depicted embodiment, the I/O module 435 includes a network interface. In various implementations, the network interface may be a wireless network interface. In some designs, the network interface may be a Wi-Fi interface. In some embodiments, the network interface may be a Bluetooth interface. In an illustrative example, the camera 130 may include more than one network interface. In some designs, the network interface may be a wireline interface. In some designs, the network interface may be omitted. In the depicted embodiment, the processor 405 is communicatively and operably coupled with the user interface 440. In various implementations, the user interface 440 may be adapted to receive input from a user or send output to a user. In some embodiments, the user interface 440 may be adapted to an input-only or output-only user interface mode. In various implementations, the user interface 440 may include an imaging display. In some embodiments, the user interface 440 may include an audio interface. In some designs, the audio interface may include an audio input. In various designs, the audio interface may include an audio output. In some implementations, the user interface 440 may be touch-sensitive. In some designs, the camera 130 may include an accelerometer operably coupled with the processor 405. In various embodiments, the camera 130 may include a GPS module operably coupled with the processor 405. In an illustrative example, the camera 130 may include a magnetometer operably coupled with the processor 405. In some embodiments, the user interface 440 may include an input sensor array. In various implementations, the input sensor array may include one or more imaging sensor. In some embodiments, the imaging sensor may be adapted to capture 360-degree video images. In some implementations, the imaging sensor may include a time-of-flight sensor and emitter adapted to enable the camera 130 to determine the distance to a reference point. In some examples, the imaging sensor may include two spatially separated time-of-flight sensor and emitter pairs, configured to permit the camera 130 to triangulate a distance to a known reference point. In various designs, the input sensor array may include one or more audio transducer. In some implementations, the input sensor array may include a radio-frequency detector. In an illustrative example, the input sensor array may include an ultrasonic audio transducer. In some embodiments, the input sensor array may include image sensing subsystems or modules configurable by the processor 405 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In various implementations, the depicted memory 410 may contain processor executable program instruction modules configurable by the processor 405 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In some embodiments, the input sensor array may include audio sensing subsystems or modules configurable by the processor 405 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In various implementations, the depicted memory 410 may contain processor executable program instruction modules configurable by the processor 405 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In the depicted embodiment, the processor 405 is communicatively and operably coupled with the multimedia interface 445. In the illustrated embodiment, the multimedia interface 445 includes interfaces adapted to input and output of audio, video, and image data. In some embodiments, the multimedia interface 445 may include one or more still image camera or video camera. In various designs, the multimedia interface 445 may include one or more microphone. In some implementations, the multimedia interface 445 may include a wireless communication means configured to operably and communicatively couple the multimedia interface 445 with a multimedia data source or sink external to the camera 130. In various designs, the multimedia interface 445 may include interfaces adapted to send, receive, or process encoded audio or video. In various embodiments, the multimedia interface 445 may include one or more video, image, or audio encoder. In various designs, the multimedia interface 445 may include one or more video, image, or audio decoder. In various implementations, the multimedia interface 445 may include interfaces adapted to send, receive, or process one or more multimedia stream. In various implementations, the multimedia interface 445 may include a GPU. In some embodiments, the multimedia interface 445 may be omitted. Useful examples of the illustrated camera 130 include, but are not limited to, personal computers, servers, tablet PCs, smartphones, or other computing devices. In some embodiments, multiple camera 130 devices may be operably linked to form a computer network in a manner as to distribute and share one or more resources, such as clustered computing devices and server banks/farms. Various examples of such general-purpose multi-unit computer networks suitable for embodiments of the disclosure, their typical configuration and many standardized communication links are well known to one skilled in the art, as explained in more detail in the foregoing FIG. 2 description. In some embodiments, an exemplary camera 130 design may be realized in a distributed implementation. In an illustrative example, some camera 130 designs may be partitioned between a client device, such as, for example, a phone, and, a more powerful server system, as depicted, for example, in FIG. 2. In various designs, a camera 130 partition hosted on a PC or mobile device may choose to delegate some parts of computation, such as, for example, machine learning or deep learning, to a host server. In some embodiments, a client device partition may delegate computation-intensive tasks to a host server to take advantage of a more powerful processor, or to offload excess work. In an illustrative example, some devices may be configured with a mobile chip including an engine adapted to implement specialized processing, such as, for example, neural networks, machine learning, artificial intelligence, image recognition, audio processing, or digital signal processing. In some embodiments, such an engine adapted to specialized processing may have sufficient processing power to implement some features. However, in some embodiments, an exemplary camera 130 may be configured to operate on a device with less processing power, such as, for example, various gaming consoles, which may not have sufficient processor power, or a suitable CPU architecture, to adequately support camera 130. Various embodiment designs configured to operate on a such a device with reduced processor power may work in conjunction with a more powerful server system.

Figure 5:
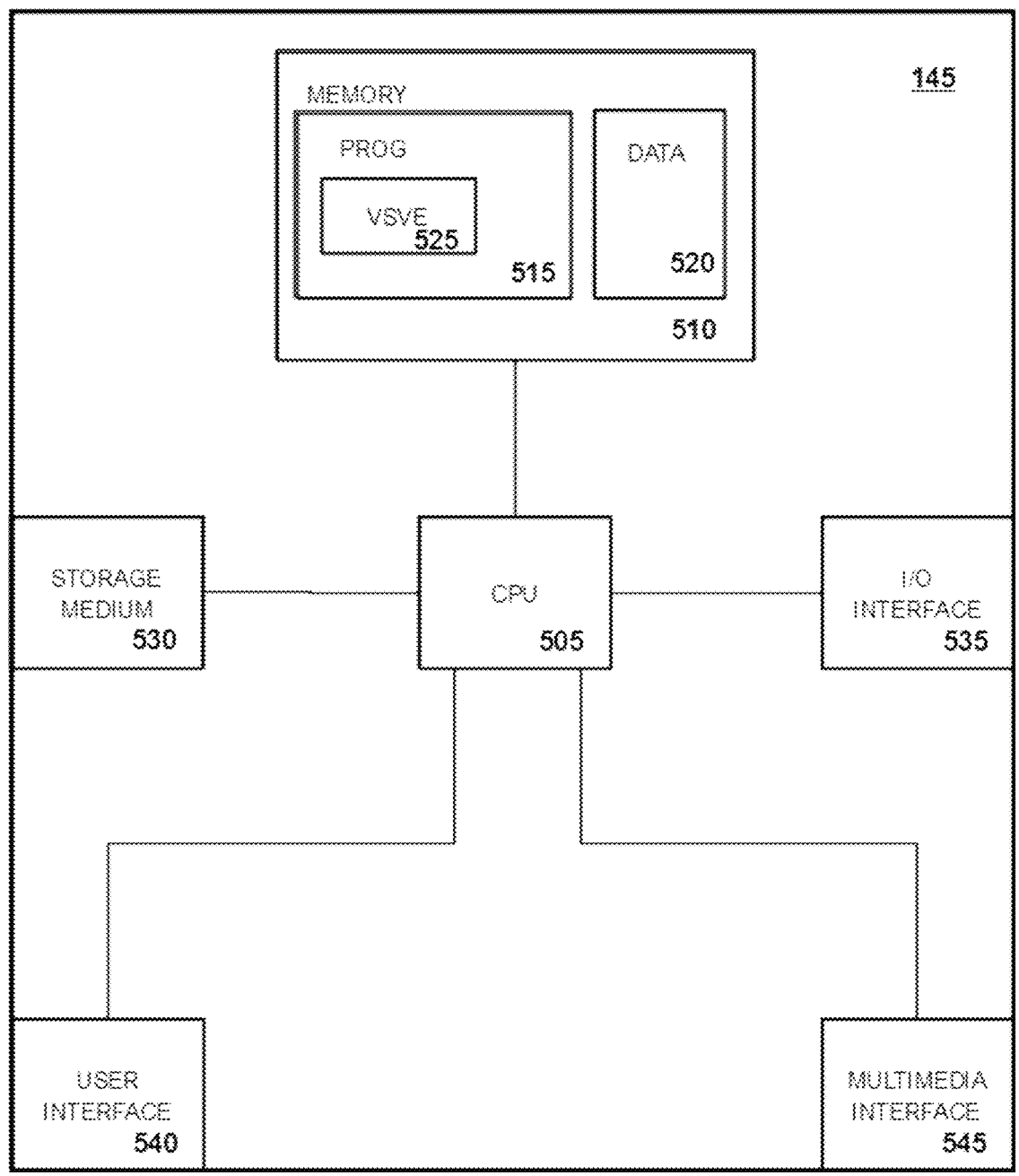
FIG. 5 depicts a structural view of an exemplary mobile computing device adapted to present event video streamed from diverse event locations.

FIG. 5 depicts a structural view of an exemplary mobile computing device adapted to present event video streamed from diverse event locations. In FIG. 5, the block diagram of the exemplary mobile device 145 includes processor 505 and memory 510. The processor 505 is in electrical communication with the memory 510. The depicted memory 510 includes program memory 515 and data memory 520. The depicted program memory 515 includes processor-executable program instructions implementing the Video Stream Viewer Engine (VSVE) 525. In some embodiments, the illustrated program memory 515 may include processor-executable program instructions configured to implement an OS (Operating System). In various embodiments, the OS may include processor executable program instructions configured to implement various operations when executed by the processor 505. In some embodiments, the OS may be omitted. In some embodiments, the illustrated program memory 515 may include processor-executable program instructions configured to implement various Application Software. In various embodiments, the Application Software may include processor executable program instructions configured to implement various operations when executed by the processor 505, In some embodiments, the Application Software may be omitted. In the depicted embodiment, the processor 505 is communicatively and operably coupled with the storage medium 530. In the depicted embodiment, the processor 505 is communicatively and operably coupled with the I/O (Input/Output) module 535. In the depicted embodiment, the I/O module 535 includes a network interface. In various implementations, the network interface may be a wireless network interface. In some designs, the network interface may be a Wi-Fi interface. In some embodiments, the network interface may be a Bluetooth interface. In an illustrative example, the mobile device 145 may include more than one network interface. In some designs, the network interface may be a wireline interface. In some designs, the network interface may be omitted. In the depicted embodiment, the processor 505 is communicatively and operably coupled with the user interface 540. In various implementations, the user interface 540 may be adapted to receive input from a user or send output to a user. In some embodiments, the user interface 540 may be adapted to an input-only or output-only user interface mode. In various implementations, the user interface 540 may include an imaging display. In some embodiments, the user interface 540 may include an audio interface. In some designs, the audio interface may include an audio input. In various designs, the audio interface may include an audio output. In some implementations, the user interface 540 may be touch-sensitive. In some designs, the mobile device 145 may include an accelerometer operably coupled with the processor 505. In various embodiments, the mobile device 145 may include a GPS module operably coupled with the processor 505. In an illustrative example, the mobile device 145 may include a magnetometer operably coupled with the processor 505. In some embodiments, the user interface 540 may include an input sensor array. In various implementations, the input sensor array may include one or more imaging sensor. In various designs, the input sensor array may include one or more audio transducer. In some implementations, the input sensor array may include a radio-frequency detector. In an illustrative example, the input sensor array may include an ultrasonic audio transducer. In some embodiments, the input sensor array may include image sensing subsystems or modules configurable by the processor 505 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In various implementations, the depicted memory 510 may contain processor executable program instruction modules configurable by the processor 505 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In some embodiments, the input sensor array may include audio sensing subsystems or modules configurable by the processor 505 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In various implementations, the depicted memory 510 may contain processor executable program instruction modules configurable by the processor 505 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In the depicted embodiment, the processor 505 is communicatively and operably coupled with the multimedia interface 545. In the illustrated embodiment, the multimedia interface 545 includes interfaces adapted to input and output of audio, video, and image data. In some embodiments, the multimedia interface 545 may include one or more still image camera or video camera. In various designs, the multimedia interface 545 may include one or more microphone. In some implementations, the multimedia interface 545 may include a wireless communication means configured to operably and communicatively couple the multimedia interface 545 with a multimedia data source or sink external to the mobile device 145. In various designs, the multimedia interface 545 may include interfaces adapted to send, receive, or process encoded audio or video. In various embodiments, the multimedia interface 545 may include one or more video, image, or audio encoder. In various designs, the multimedia interface 545 may include one or more video, image, or audio decoder. In various implementations, the multimedia interface 545 may include interfaces adapted to send, receive, or process one or more multimedia stream. In various implementations, the multimedia interface 545 may include a GPU. In some embodiments, the multimedia interface 545 may be omitted. Useful examples of the illustrated mobile device 145 include, but are not limited to, personal computers, servers, tablet PCs, smartphones, or other computing devices. In some embodiments, multiple mobile device 145 devices may be operably linked to form a computer network in a manner as to distribute and share one or more resources, such as clustered computing devices and server banks/farms. Various examples of such general-purpose multi-unit computer networks suitable for embodiments of the disclosure, their typical configuration and many standardized communication links are well known to one skilled in the art, as explained in more detail in the foregoing FIG. 2 description. In some embodiments, an exemplary mobile device 145 design may be realized in a distributed implementation. In an illustrative example, some mobile device 145 designs may be partitioned between a client device, such as, for example, a phone, and, a more powerful server system, as depicted, for example, in FIG. 2. In various designs, a mobile device 145 partition hosted on a PC or mobile device may choose to delegate some parts of computation, such as, for example, machine learning or deep learning, to a host server. In some embodiments, a client device partition may delegate computation-intensive tasks to a host server to take advantage of a more powerful processor, or to offload excess work. In an illustrative example, some devices may be configured with a mobile chip including an engine adapted to implement specialized processing, such as, for example, neural networks, machine learning, artificial intelligence, image recognition, audio processing, or digital signal processing. In some embodiments, such an engine adapted to specialized processing may have sufficient processing power to implement some features. However, in some embodiments, an exemplary mobile device 145 may be configured to operate on a device with less processing power, such as, for example, various gaming consoles, which may not have sufficient processor power, or a suitable CPU architecture, to adequately support mobile device 145. Various embodiment designs configured to operate on a such a device with reduced processor power may work in conjunction with a more powerful server system.

Figure 6A:
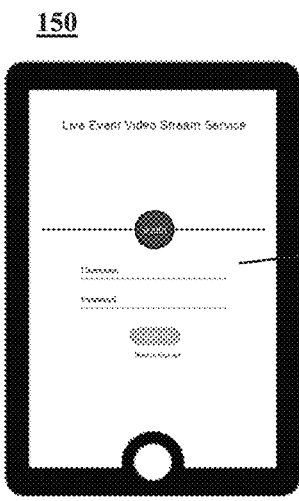
FIGS. 6A-6G together depict an illustrative view of an exemplary mobile device user interface configured to present event video streamed from diverse event locations.
Figure 6B:
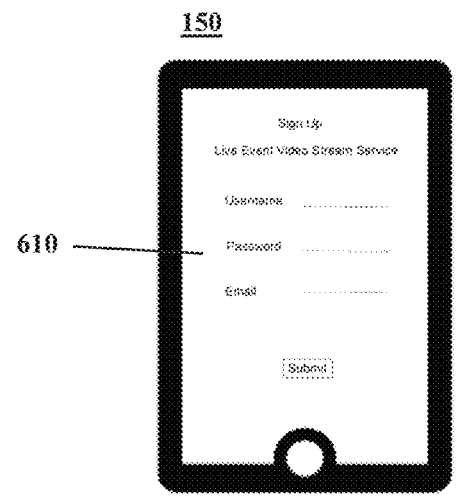
Figure 6C:
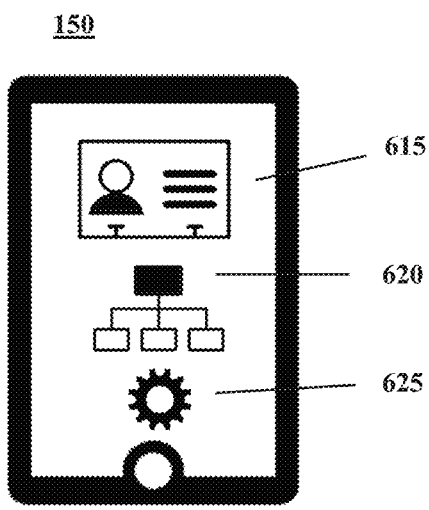
Figure 6D:
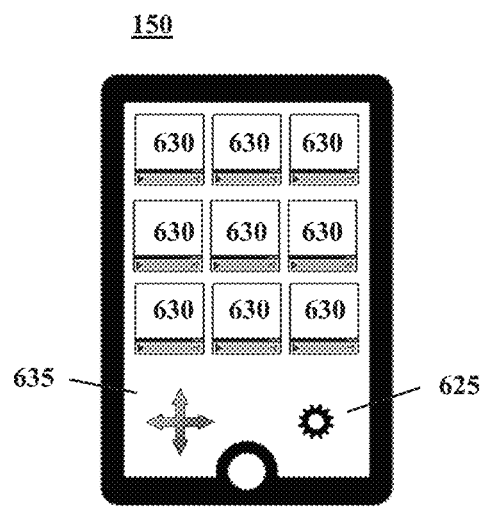
Figure 6E:
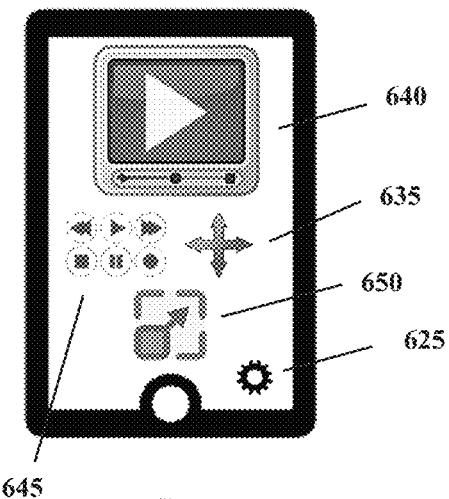
Figure 6F:
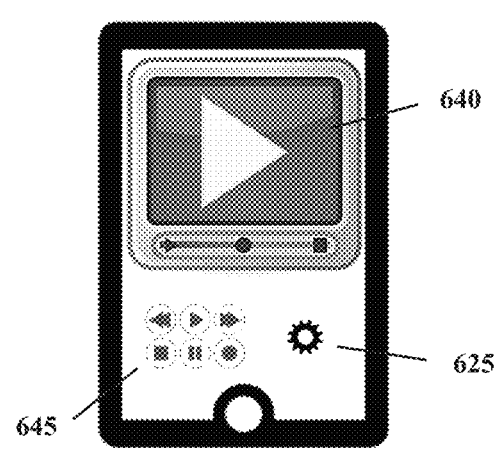
Figure 6G:
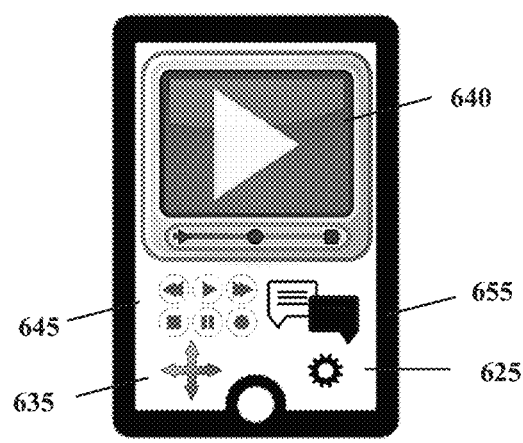

FIGS. 6A-6G together depict an illustrative view of an exemplary mobile device user interface configured to present event video streamed from diverse event locations. In the depicted examples, the exemplary user interface 150 is adapted to facilitate selection, adjustment, and viewing of diverse live event video streams captured from multiple unique camera positions. In FIG. 6A, the depicted user interface 150 includes the welcome menu 605 presenting a user with the opportunity to sign in with an existing account to view live event streaming video, or sign up to create an account. In FIG. 6B, the illustrated user interface 150 presents the user with the account creation menu 610 providing the user an opportunity to register a new account. In FIG. 6C, the depicted user interface 150 provides the user with the user account profile menu 615. In various examples, the user account profile menu 615 may include content preferences, payment methods, viewing history, password reset, contact details, or other options related to user account data. In the illustrated embodiment, the live event selection menu 620 presents the user with various live events offered for streaming. In the depicted example, the live event video stream service user settings menu 625 enables the user to access video streaming preferences and configuration options. For example, in some embodiments, the live event video stream service settings menu 625 may permit the user to set a bid price threshold or bidding strategy for a video stream auction, configure camera settings, or access other user options related to video streaming preferences. In FIG. 6D, the exemplary user interface 150 displays various video stream thumbnail 630 images of video streams available for user selection from a live event selected using the live event selection menu 620, depicted in FIG. 6C. In the depicted example, each of the video streams available represented by the thumbnail 630 images are captured from a camera in a unique position at the live event. In the illustrated example, the stream view control 635 permits the user to pan, tilt, and zoom a camera capturing a selected video stream. In FIG. 6E, the illustrative user interface 150 displays the selected video streams in the stream viewer 640. In the depicted example, the stream viewer 640 may be resized by the viewer. In the illustrated example, the stream viewer 640 is depicted in a reduced-size mode. In the depicted embodiment, the video stream controls 645 permit the user to play, pause, reverse, continue, or stop an active video stream in the stream viewer 640. In the depicted example, the video stream resize control 650 enables the user to select and optionally resize a portion of the video stream display for viewing in the stream viewer 640. In FIG. 6F, the stream viewer 640 is depicted in an expanded size configuration. In FIG. 6G, the user has adjusted viewing session parameters in the live event video stream service user settings menu 625 to configure the live chat session 655 with a live event performer.

Figure 7:
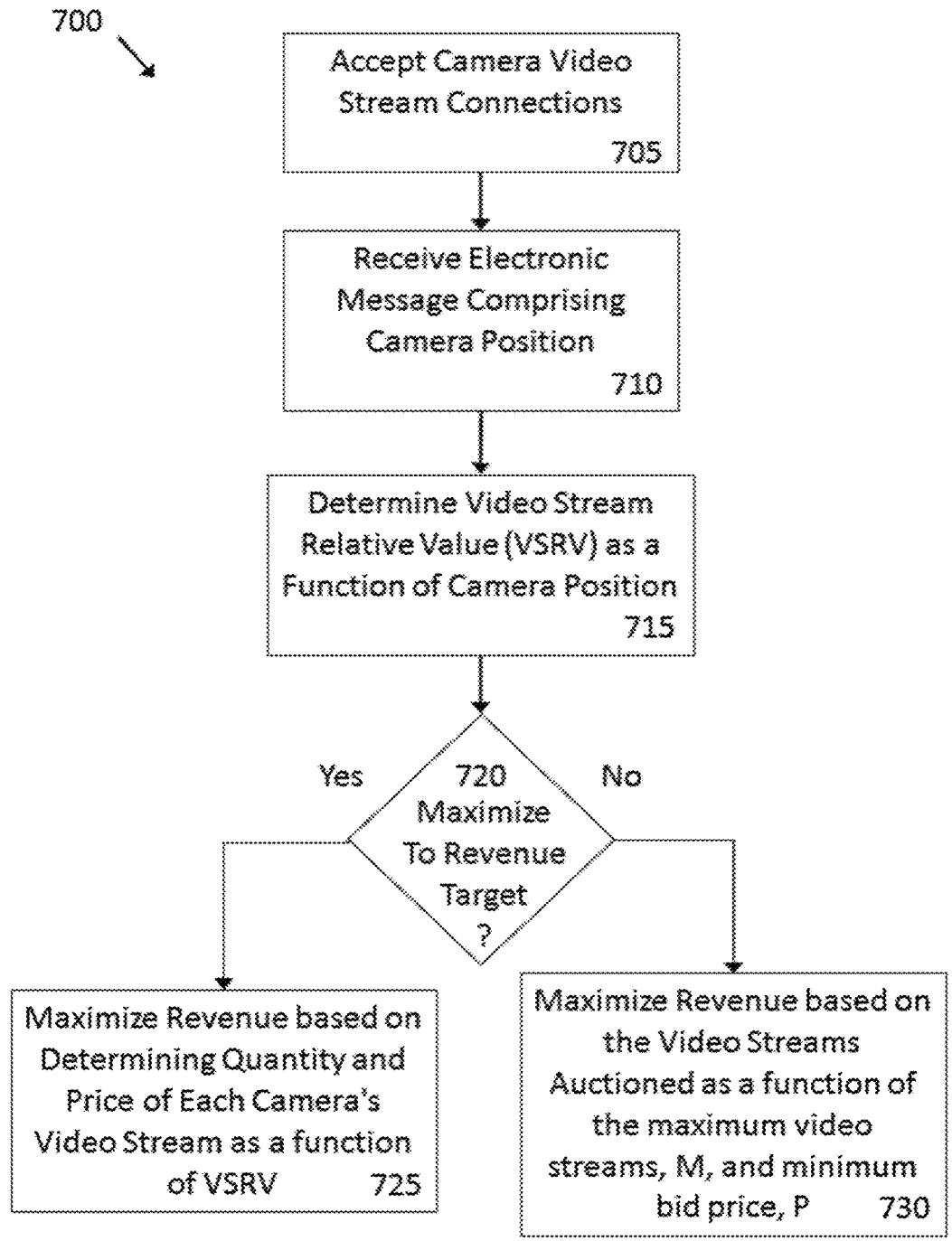
FIG. 7 depicts an exemplary process flow of an embodiment Video Stream Distribution Engine (VSDE).

FIG. 7 depicts an exemplary process flow of an embodiment Video Stream Distribution Engine (VSDE). The method depicted in FIG. 7 is given from the perspective of the VSDE 325 implemented via processor-executable program instructions executing on the live event video stream service 110 processor 305, depicted in FIG. 3. In various embodiments, the method depicted in FIG. 7 may also be understood as from the perspective of processor-executable program instructions executing on the mobile device 145 processor 505, depicted in FIG. 5. In the illustrated embodiment, the VSDE 325 executes as program instructions on the processor 305 configured in the VSDE 325 host HO, depicted in at least FIG. 1, FIG. 2, and FIG. 3. In some embodiments, the VSDE 325 may execute as a cloud service communicatively and operatively coupled with system services, hardware resources, or software elements local to and/or external to the VSDE 325 host 110. The depicted method 700 begins at step 705 with the processor 305 accepting camera video stream connections. Then, the method continues at step 710 with the processor 305 receiving an electronic message including each camera's position. In some embodiments, the processor 305 may receive a single message including the position of all connected cameras. In various designs, the processor 305 may receive a message including the position of fewer than all the connected cameras. In an illustrative example, the camera position included in the message received by the processor 305 may include GPS coordinates. In various implementations, the camera position included in the message received by the processor 305 may include an offset or displacement distance relative to one or more points defined by the message or otherwise configured in the live event video stream service 110. The method continues at step 715 with the processor 305 determining the Video Stream Relative Value (VSRV) of each camera as a function of the camera position. In various embodiments, the VSRV of each camera may be a numeric value determined as a function of relative camera position. In some designs, the VSRV may be administratively configured for at least a portion of connected cameras. In some embodiments, the VSRV may be limited to any or both of a minimum or maximum threshold. Value. In an illustrative example, one or more threshold value may be determined as a result of an auction. In some examples, one or more threshold value may be administratively configured. At step 720 the processor 305 performs a test to determine if live event revenue is to be maximized to a target value. Upon a determination by the processor 305 at step 720 revenue is to be maximized to a target value, the method continues at step 725 with the processor 305 maximizing revenue based on determining each camera's video stream offered quantity and price adjusted as a function of the VSRV determined by the processor 305 at step 715. Upon a determination by the processor 305 at step 720 revenue is not to be maximized to a target value, the method continues at step 730 with the processor 305 maximizing revenue based on the camera video streams auctioned as a function of the maximum video streams, M, and the minimum bid price, P. In various embodiments, the maximum video streams, M, and the minimum bid price, P, may be configured by the event operator to any values suitable to maximize revenue based on the diversity of camera positions.

Figure 8:
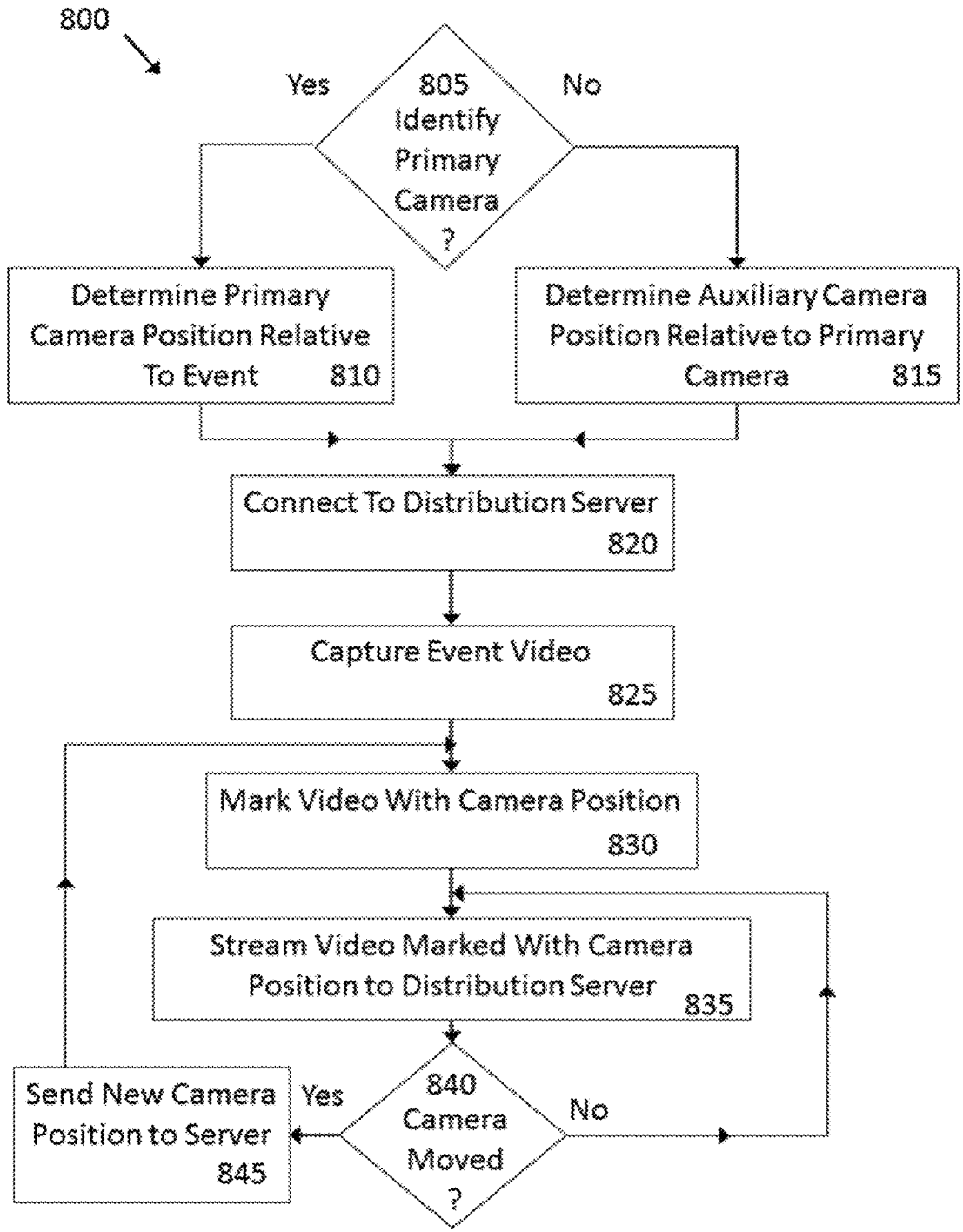
FIG. 8 depicts an exemplary process flow of an embodiment Video Stream Capture Engine (VSCE).

FIG. 8 depicts an exemplary process flow of an embodiment Video Stream Capture Engine (VSCE). The method depicted in FIG. 8 is given from the perspective of the VSCE 425 implemented via processor-executable program instructions executing on the camera 130 processor 405, depicted in FIG. 4. In the illustrated embodiment, the VSCE 425 executes as program instructions on the processor 405 configured in the VSCE 425 host camera 130, depicted in at least FIG. 1, FIG. 2, and FIG. 4. In some embodiments, the VSCE 425 may execute as a cloud service communicatively and operatively coupled with system services, hardware resources, or software elements local to and/or external to the VSCE 425 host camera 130. The depicted method 800 begins at step 805 with the processor 405 performing a test to determine if the camera 130 is identified as the primary camera, or an auxiliary camera, of a camera 130 set, configured to capture and stream a live event. In some embodiments, the identity of the camera 130 as the primary camera 130 may be administratively configured. In various implementations, the primary camera identity may be determined based on order of camera connection to a distribution server. Upon a determination by the processor 405 at step 805 the camera 130 is the primary event camera, the method continues at step 810 with the processor 405 determining the primary camera 130 position relative to the event. Upon a determination by the processor 405 at step 805 the camera 130 is not the primary event camera, the method continues at step 815 with the processor 405 determining the camera 130 is an auxiliary event camera, and the processor 405 determines the auxiliary camera position relative to the primary camera. In various embodiments, the camera 130 may exchange with a server or another camera various messages including the camera position relative to the distribution server, or the camera position relative to another camera, including, for example, the primary camera, as a part of determining the auxiliary camera position relative to the primary camera. The method continues at step 820 with the processor 405 completing a video streaming connection to a distribution server. Then, the method continues at step 825 with the processor 405 capturing event video. The method continues at step 830 with the processor 405 marking the captured video with the camera position. In some embodiments, the position may be marked in the video based on video watermarking techniques known in the multimedia arts. In various embodiments, the camera position may be marked in the video content stream on a frame-by-frame basis. In some designs, the camera position marked in the camera video stream may be dynamically updated as the camera moves, or if the primary camera moves relative to an auxiliary camera. In an illustrative example, in some embodiments, an embodiment camera mounted to an airborne drone, or worn as a body camera by a mobile person or robot, may dynamically update the camera video stream as the camera position changes due to movement of the person, drone, or robot. In such an example, the value of the camera video stream may be updated as the camera moves, changing in real time the event revenue based on the value of the streams offered. The method continues at step 835 with the processor 405 streaming video marked with the camera position to the distribution server. At step 840, the processor 405 performs a test to determine if the camera 130 moved, based on comparing the previous camera position with the current camera position. Upon a determination by the processor 405 at step 840 the camera 130 did not move, the method continues at step 835 with the processor 405 streaming video marked with the camera position to the distribution server. Upon a determination by the processor 405 at step 840 the camera 130 did move, the method continues at step 830 with the processor 405 marking the captured video with the camera position.

Figure 9:
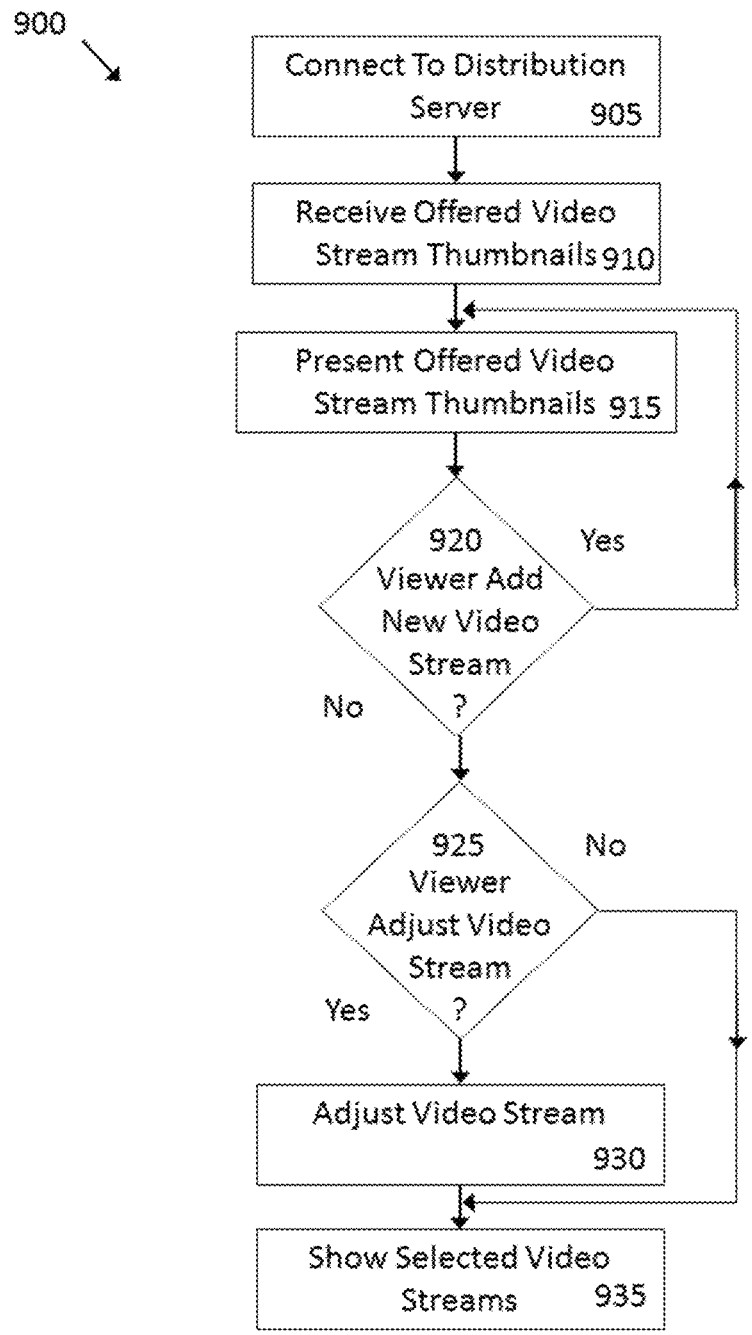
FIG. 9 depicts an exemplary process flow of an embodiment Video Stream Viewer Engine (VSVE).

FIG. 9 depicts an exemplary process flow of an embodiment Video Stream Viewer Engine (VSVE). The method depicted in FIG. 9 is given from the perspective of the VSVE 525 implemented via processor-executable program instructions executing on the mobile device 145 processor 505, depicted in FIG. 5. In the illustrated embodiment, the VSVE 525 executes as program instructions on the processor 505 configured in the VSVE 525 host mobile device 145, depicted in at least FIG. 1, FIG. 2, and FIG. 5. In some embodiments, the VSVE 525 may execute as a cloud service communicatively and operatively coupled with system services, hardware resources, or software elements local to and/or external to the VSVE 525 host mobile device 145. The depicted method 900 begins at step 905 with the processor 505 connecting to a distribution server. Then, the method continues at step 910 with the processor 505 receiving offered video stream thumbnail images from the distribution server. The method continues at step 915 with the processor 505 presenting the offered video stream thumbnail images to a potential viewer using the mobile device 145 user interface. The method continues at step 920 with the processor 505 performing a test to determine if the viewer has added a new video stream offered via the mobile device 145 user interface. Upon a determination by the processor 505 at step 920 the viewer has added a new video stream offered via the mobile device 145 user interface, the method continues at step 915 with the processor 505 adding the selected video stream, and presenting the offered video stream thumbnail images to a potential viewer using the mobile device 145 user interface. Upon a determination by the processor 505 at step 920 the viewer has not added a new video stream, the method continues at step 925 with the processor 505 performing a test to determine if the viewer initiated an adjustment to one or more video stream. In some embodiments, the viewer may initiate various video stream adjustments, including camera control, such as, for example, camera pan, tilt, or zoom. Upon a determination by the processor 505 at step 925 the viewer did initiate a video stream adjustment, the method continues at step 930 with the processor 505 adjusting the video stream, and the method continues at step 935. Upon a determination by the processor 505 at step 925 the viewer did not initiate a video stream adjustment, the method continues at step 935 with the processor 505 showing the selected video streams to the user via the mobile device 145 user interface.

Although various embodiments have been described with reference to the Figures, other embodiments are possible. For example, some embodiments may provide a new way to sell online show tickets to maximize profits for the venue organizer. Various embodiment implementation designs may enable an online digital show to offer different ticket prices based on different options a viewer can buy from the show. Some designs are able to bring more profits to the venue operator.

In various scenarios exemplary of prior art usage before online entertainment technology, people went to theaters to watch shows. Many shows were able to price their tickets in different categories. Chiefly, in some prior art examples, the more expensive tickets provided a closer proximity to the stage for better video and audio effects. Some prior art tickets may have been priced higher for some other benefits, such as back stage or on stage visits. This way, some shows were able to maximize their profits, selling more expensive tickets to those that could afford them to get the exclusively marginal benefits, while selling the normal or less expensive tickets to those that could only afford the bare minimum to enjoy a show. This strategy is advantageous for the show; they were able to cater to wider demographics, rich and poor.

In some prior art examples of a typical digital online entertainment platform, it is rather difficult to maximize ticket revenues by creating different classes of tickets via a spatial segregation. There is no spatial segregation possible: every viewer hears the same audio and sees the same video. For example, in some prior art digital online entertainment platform examples, there may be only one price for tickets, as every online viewer sees the same camera and hears from the same microphone. Such a prior art digital online entertainment platform has the disadvantage that everyone pays the same price for the same show.

Various embodiments of the present invention change what is possible to maximize ticket revenues by creating different classes of tickets. It is an object of various embodiments in accordance with the present disclosure to re-create online the way a traditional offline theater can sell different tickets at different prices to different groups for different audio and visual experiences.

In an illustrative example, some embodiment implementation design features may include:
1) Multiple 360 degree cameras on stage and in back stage, and at anywhere a view might be willing to pay to watch a closer vista;
2) Multiple 360 degree cameras in the audience hall;
3) Multiple 360 degree cameras outside the venue;
4) Live chats;
5) For example, if we have ten of such cameras, we may create ten channels and livestream them live;
6) Every viewer has to buy a general ticket (the least expensive class) to enter a show;
   a. The viewer can then add on cameras;
   b. The more cameras he buys the more vistas he will have of the show;
   c. Some cameras are more expensive than the others;
   d. For example, if the viewer is a pianist, he might buy the extra camera next to the piano;
7) For each camera, the viewer will have full control of it. Zooming and rotating the camera, up to 360 degrees;
8) The viewer can wander from one camera to another. He can go from watching the pianist to the back stage camera, provided he has bought both;
9) For those viewers who do not buy any additional cameras, their vista will only be from the venue's main camera and audio, the same as any live streaming event right now;
10) Some embodiments may include a pre-show Ticket auctioning feature; for example, each viewer can enter his highest bid price to see a show. The show organizer will announce the maximum number of tickets, M, available and the minimum bid price, P. When the show starts, the organizer will do the following:

a. If the number of bidders is greater than or equal to M, then the first M bidders will be admitted and the final ticket price for all the M viewers will be the higher of the lowest bid price or the minimum price, P, among the M viewers;

b. If the number of bidders is less than M, then all the bidders will be admitted and the final ticket price for all the bidders will be the higher of the lowest bid price or the minimum price, P, among the bidders.

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used to the extent possible in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments. elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of." In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f).

According to an embodiment of the present invention, the system and method may be accomplished through the use of one or more computing devices. As depicted, for example, at least in FIG. 1, FIG. 2, FIG. 3, FIG. 4, FIG. 5, FIG. 6, FIG. 7, FIG. 8, and FIG. 9, one of ordinary skill in the art would appreciate that an exemplary system appropriate for use with embodiments in accordance with the present application may generally include one or more of a Central processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with embodiments of the present invention include, but are not limited to, proprietary computing devices, personal computers, mobile computing devices, tablet PCs, mini-PCs, servers or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In various embodiments, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with embodiments of the present invention, and embodiments of the present invention are contemplated for use with any appropriate configuration.

According to an embodiment of the present invention, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth connections, or any combination thereof. One of ordinary skill in the art would appreciate that there are numerous communications means that may be utilized with embodiments of the present invention, and embodiments of the present invention are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a sequence of computational instructions or program instructions. It will be appreciated that a programmable apparatus (i.e., computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

The embodiments disclosed hereinabove may be summarized as follows.

Embodiment 1

A process, comprising: a method to maximize live event profit distributing event video streams at diverse price levels with a video stream price and quantity adapting action, comprising: configuring video cameras to capture live event video streams from different locations; offering the video streams for purchase at prices based on the camera locations; and, automatically maximizing profit by adjusting the quantity and price of the offered camera video streams.

Embodiment 2

The process of Embodiment 1, wherein the video cameras further comprise each camera of a plurality of video cameras adapted to stream live event audio and stream live event video captured by the camera.

Embodiment 3

The process of Embodiment 2, wherein offering the video streams for purchase further comprises offering the audio streams for purchase.

Embodiment 4

The process of Embodiment 1, wherein the plurality of video cameras includes 360-degree video cameras.

Embodiment 5

The process of Embodiment 1, wherein the process further comprises determining a range of live event camera positions ranging from more preferred to less preferred live event viewing positions.

Embodiment 6

The process of Embodiment 5, wherein offering the video streams for purchase at prices based on the camera locations further comprises determining each video stream's price as a function of the proximity to the live event of the camera capturing the video stream.

Embodiment 7

The process of Embodiment 1, wherein the live event further comprises a performer and a viewer; and, offering the video streams for purchase further comprises presenting the video streams to the viewer.

Embodiment 8

The process of Embodiment 7, wherein offering the video streams for purchase further comprises presenting a video stream to a mobile device controlled by the viewer.

Embodiment 9

The process of Embodiment 7, wherein the process further comprises facilitating live chat between the performer and the viewer.

Embodiment 10

A process, comprising: a method to maximize live event profit distributing event audio and video streams at diverse price levels with a multimedia stream price and quantity adapting action, comprising: determining a range of live event camera positions ranging from more preferred to less preferred live event viewing positions; configuring each camera of a plurality of multimedia cameras to stream live event audio and video captured by the camera from a unique camera location selected from the range of live event camera positions; offering the captured audio and video streams to a viewer for purchase at prices determined as a function of the camera locations; and, automatically maximizing profit by adjusting the quantity and price of the offered audio and video streams.

Embodiment 11

The process of Embodiment 10, wherein offering the captured audio and video streams for purchase further comprises prices determined based on an auction.

Embodiment 12

The process of Embodiment 11, wherein automatically maximizing profit by adjusting the quantity and price of the offered audio and video streams further comprises the offered audio and video streams quantity determined as a function of the auction.

Embodiment 13

The process of Embodiment 12, wherein the offered audio and video streams quantity determined as a function of the auction further comprises auction parameters determined as a function of the range of live event camera positions ranging from more preferred to less preferred live event viewing positions.

Embodiment 14

The process of Embodiment 10, wherein offering the captured audio and video streams for purchase further comprises presenting the video streams to a mobile device.

Embodiment 15

The process of Embodiment 10, wherein the live event further comprises a performer; and, the process further comprises facilitating live chat between the performer and the viewer.

Embodiment 16

A process, comprising: a method to maximize live event profit distributing event audio and video streams at diverse price levels with a multimedia stream price and quantity adapting action, comprising: determining a range of live event camera positions ranging from more preferred to less preferred live event viewing positions; configuring each camera of a plurality of cameras to stream live event audio and video captured by the camera from a unique camera location selected from the range of live event camera positions; assigning each camera position a valuation determined as a function of the camera position relative to the live event; conducting an auction to determine the quantity and price of the audio and video streams to be offered; offering the captured audio and video streams to a viewer for purchase at prices determined as a function of the auction; and, automatically maximizing profit by adjusting the quantity and price of the offered audio and video streams.

Embodiment 17

The process of Embodiment 16, wherein assigning each camera position a valuation further comprises each camera position's valuation determined relative to the positions of the plurality of cameras.

Embodiment 18

The process of Embodiment 16, wherein the plurality of cameras further comprises multimedia cameras.

Embodiment 19

The process of Embodiment 16, wherein conducting an auction further comprises auction parameters determined as a function of the range of live event camera positions ranging from more preferred to less preferred live event viewing positions.

Embodiment 20

The process of Embodiment 19, wherein the auction parameters further comprise: a maximum number of tickets; and, a minimum bid price.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:
1. A process, comprising:
   a method to maximize live event profit distributing event video streams at diverse price levels with a video stream price and quantity adapting action, comprising:

configuring a plurality of video cameras to capture live event video streams from different locations, wherein each camera of the plurality of video cameras is configured to stream live event audio and stream live event video captured by the camera, wherein at least one of the plurality of video cameras is a moveable video camera, wherein at least one of the plurality of the plurality of video cameras is mounted to a moveable drone and is configured to stream video captured by the camera from the drone while the drone moves;

offering the video streams for purchase at prices based on the camera locations, wherein at least one video stream offered for purchase is presented to a viewer through a mobile device controlled by the viewer;

providing the viewer control of purchased video streams, based on enabling the viewer to control the cameras using controls in a user interface of the mobile device, wherein the controls a configured to play, pause, reverse, continue, change perspective, zoom, and stop a video stream;

displaying a plurality of video streams represented as thumbnail images in a stream viewer, wherein each video stream is captured from a camera in a unique position, and selecting a thumbnail image of a video stream causes the selected video stream to open for viewing, wherein the price for a video stream captured by at least one moveable video camera is automatically updated in real time as a function of the moveable video camera location as the moveable video camera moves; and, automatically maximizing profit by adjusting the quantity and price of the offered camera video streams.

2. The process of claim 1, wherein offering the video streams for purchase further comprises offering the audio streams for purchase.

3. The process of claim 1, wherein the plurality of video cameras includes 360-degree video cameras.

4. The process of claim 1, wherein the process further comprises determining a range of live event camera positions ranging from more preferred to less preferred live event viewing positions.

5. The process of claim 4, wherein offering the video streams for purchase at prices based on the camera locations further comprises determining each video stream's price as a function of the proximity to the live event of the camera capturing the video stream.

6. The process of claim 1, wherein the live event further comprises a performer and a viewer; and wherein the process further comprises facilitating live chat between the performer and the viewer.

7. The process of claim 1, wherein enabling the viewer to control the cameras using the mobile device further comprises the mobile device user interface configured to permit the viewer to control the cameras' pan, tilt, and zoom using the mobile device.

8. A process, comprising:
a method to maximize live event profit distributing event audio and video streams at diverse price levels with a multimedia stream price and quantity adapting action, comprising:
determining a range of live event camera positions ranging from more preferred to less preferred live event viewing positions;
configuring each camera of a plurality of multimedia cameras to stream live event audio and video captured by the camera from a unique camera location selected from the range of live event camera positions, wherein each of the plurality of multimedia cameras is configured to stream live event audio and stream live event video captured by the camera, wherein at least one of the cameras is a moveable video camera, wherein at least one of the plurality of multimedia cameras is mounted to a moveable drone and is configured to stream video captured by the camera from the drone while the drone moves;

offering the captured audio and video streams to a viewer for purchase at prices determined as a function of the camera locations, wherein at least one stream offered for purchase is presented to a viewer through a mobile device operable by the viewer;

providing the viewer control of purchased video streams, based on enabling the viewer to control the cameras' pan, tilt, and zoom using controls in a user interface of the mobile device to direct the cameras to capture scenes selected by the viewer, wherein the controls a configured to play, pause, reverse, continue, change perspective, zoom, and stop a video stream;

displaying a plurality of video streams represented as thumbnail images in a stream viewer, wherein each video stream is captured from a camera in a unique position, and selecting a thumbnail image of a video stream causes the selected video stream to open for viewing, wherein the price for a video stream captured by at least one moveable video camera is automatically updated in real time as a function of the moveable video camera location as the moveable video camera moves; and, automatically maximizing profit by adjusting the quantity and price of the offered audio and video streams.

9. The process of claim 8, wherein offering the captured audio and video streams for purchase further comprises prices determined based on an auction.

10. The process of claim 9, wherein automatically maximizing profit by adjusting the quantity and price of the offered audio and video streams further comprises the offered audio and video streams quantity determined as a function of the auction.

11. The process of claim 10, wherein the offered audio and video streams quantity determined as a function of the auction further comprises auction parameters determined as a function of the range of live event camera positions ranging from more preferred to less preferred live event viewing positions.

12. The process of claim 8, wherein offering the captured audio and video streams for purchase further comprises presenting the video streams to a virtual reality headset.

13. The process of claim 8, wherein the live event further comprises a performer; and, the process further comprises facilitating live chat between the performer and the viewer.

14. A process, comprising:
a method to maximize live event profit distributing event audio and video streams at diverse price levels with a multimedia stream price and quantity adapting action, comprising:
determining a range of live event camera positions ranging from more preferred to less preferred live event viewing positions;
configuring each camera of a plurality of cameras to stream live event audio and video captured by the camera from a unique camera location selected from the range of live event camera positions, wherein at least a portion of the plurality of cameras comprise a moveable camera;

assigning each camera position a valuation determined as a function of the camera position relative to the live event;

conducting an auction to determine the quantity and price of the audio and video streams to be offered, wherein the audio and video stream price for a moveable camera is automatically updated in the auction as a real time function of the moveable camera location as the moveable camera moves;

offering the captured audio and video streams to a viewer for purchase at prices determined as a function of the auction, wherein at least one stream offered for purchase is presented to a viewer through a mobile device operable by the viewer;

providing the viewer control of purchased video streams displayed to the viewer in the mobile device user interface, based on enabling the viewer to control the cameras' pan, tilt, and zoom using the mobile device to direct the cameras to capture scenes selected by the viewer; and, automatically maximizing profit by adjusting the quantity and price of the offered audio and video streams.

15. The process of claim 14, wherein assigning each camera position a valuation further comprises each camera position's valuation determined relative to the positions of the plurality of cameras.

16. The process of claim 14, wherein the plurality of cameras further comprises multimedia cameras.

17. The process of claim 14, wherein conducting an auction further comprises auction parameters determined as a function of the range of live event camera positions ranging from mom preferred to less preferred live event viewing positions.

18. The process of claim 17, wherein the auction parameters further comprise: a maximum number of tickets; and, a minimum bid price.

* * * * *